Sept. 25, 1962 C. A. MEAD 3,056,073
SOLID-STATE ELECTRON DEVICES
Filed Feb. 15, 1960 2 Sheets-Sheet 1

INVENTOR.
CARVER A. MEAD
BY Lyon & Lyon
ATTORNEYS

INVENTOR.
CARVER A. MEAD
BY
Lyon & Lyon
ATTORNEYS

United States Patent Office 3,056,073

Patented Sept. 25, 1962

3,056,073
SOLID-STATE ELECTRON DEVICES

Carver A. Mead, Pasadena, Calif., assignor to California Institute Research Foundation, Pasadena, Calif., a corporation of California Filed Feb. 15, 1960, Ser. No. 8,589
13 Claims. (Cl. 317—234)

This invention relates to solid-state electron devices and more particularly to improvements therein.

The latest of the solid-state electron devices which has been given wide publicity and will apparently comprise an important element in electronic circuits is called the "Tunnel" or "Esaki" diode. It has been described by L. Esaki, in the Physical Review, volume 109, page 603, 1958, and also by H. S. Sommers, in the Proceedings of the I.R.E., volume 47, page 1201, 1959. The tunnel diodes are characterized by a negative conductance region which occurs when the current falls from an excessively high value in response to the application of very low forward voltages to a value somewhat above that of a normal p-n junction at a higher forward voltage.

The "tunnel" diode is made of material designated as semiconductor material such as germanium or silicon. More specifically, it consists of p type semiconductor material joined to n type semiconductor material having a narrow p-n junction, on the order of 150 angstroms thick. The junction is made small in order that electrons from the n type material be enabled to tunnel, under the influence of an electric field, through the forbidden region in the junction.

An object of the present invention is to provide a novel and useful solid-state electron device.

Yet another object of the present invention is the provision of a novel and convenient method means for manufacturing a solid-state electron device which employs the tunnel effect phenomenon.

Still another object of the present invention is the provision of a simple convenient solid-state electron device which employs the tunnel effect phenomenon.

These and other objects of the invention may be achieved by making a solid-state electron device in the form of a diode, for example, employing two layers of a conductive metal material separated by a layer of an insulating material. The thicknes of the insulating material layer should be less than the mean-free path of an electron. Preferably, although not necessarily, lattice structure of the insulating material should reasonably match the lattice structure of the conductive metal to prevent the formation of traps at the interface. When an electric field is applied across the metal layers spaced by the insulator current can flow by the mechanism of tunneling. This structure may be employed with suitable modifications as a cathode or source of electrons. By making one of the metal layers have a thickness on the order of an electron mean-free path and applying another insulating layer followed by another metal layer a triode device can be produced.

The novel features that are characteristic of this invention are set forth with particularity in the appended claims. The invention itself both as to its organization and method of operation, as well as additional objects and advantages thereof will best be understood from the following description when read in connection with the accompanying drawings.

The phenomenon known as "Tunnel effect" is one which has been known for some time. This phenomenon is the penetration of an electron into a classically forbidden region or a region where its energy lies in a forbidden band. This invention makes use of this phenomenon for its operation.

Consider the behavior of two metal plates separated by an insulating layer, when a large voltage is connected between the two plates. If the insulating layer is thick compared with an electron mean-free path in the material (typically 500 angstroms or so) an electron in the conduction band will be accelerated by the electric field until (on the average) one mean-free path later when it will suffer a collision with the lattice. If the eletcron has gained sufficient energy in one mean-free path to raise another electron from the valence to conduction band by a collision, a cumulative liberation of electrons will take place (very similar to the processes in a gas discharge) and the insulator will suffer "avalanche breakdown." In typical insulators, this process occurs at an electric field of approximately one million volts per centimeter. However, if the insulator is made thin compared with a mean-free path, such an avalanche is no longer possible and the results of tunneling may begin to be observed. The direct tunneling of electrons from valence to conduction bands is described in "Modern Physics" by Robert L. Sproul, published by John Wiley and Sons, Inc., 1956, page 350, and credited to Zener. However, as will be shown, the mechanism of surface tunneling in general happens at a considerably lower electric field.

Figure 1:
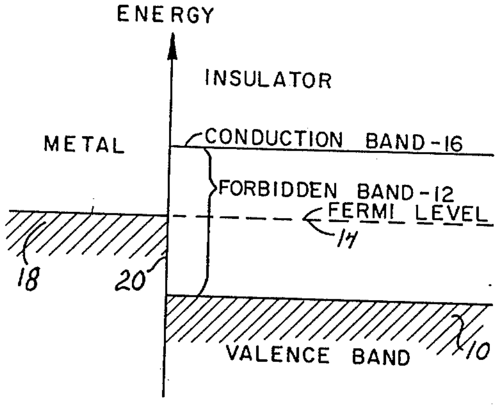
FIGURE 1 is an energy level diagram representing the conditions for thermal equilibrium at a junction between a metal and an insulator.

Referring now to FIGURE 1, there is shown an energy level diagram for two materials in contact with another. One of these is an insulator which is defined as a material with a completely filled valence band 10, a large forbidden band 12 and a Fermi level 14 which is between the valence band 10 and the conduction band 16 and not near either. The condition for thermal equilibrium at a junction 20 is that the Fermi level of the two adjoining materials lie at the same energy. Idealized representation of such metal-insulator contact is shown in FIGURE 1.

Figure 2:
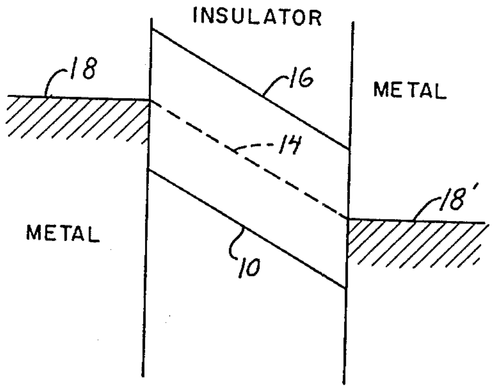
FIGURE 2 is an energy level diagram representing conditions arising in an embodiment of this invention.

When the insulator is made thin and placed between two metal plates and an electric field is applied, the energy level configuration which results is shown in FIGURE 2. Under the conditions represented in FIGURE 2, electrons in the metal on the left which are near the Fermi level may tunnel through the forbidden region in the insulator into its conduction band and thus make their way into the metal on the right. The onset of the tunneling is very abrupt and extremely high current densities may be reached. In order to insure that the electrons from the metal on the left may tunnel to the metal on the right without causing avalanche breakdown, the insulator is given a thickness of the order of the mean-free path of an electron or less. In this way, the possibility of collisions within the insulating layer is minimized. Furthermore, in order to avoid the existence of traps or trapping centers at the interface between the insulator and metal it is preferred that the lattice structure of the insulator match as closely as possible the lattice structure of the metals.

Figure 3:
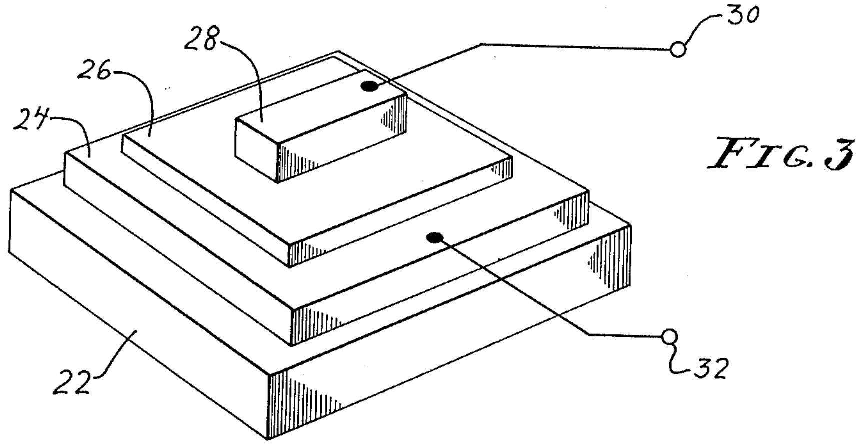
FIGURE 3 is a representation of an embodiment of this invention.

FIGURE 3 shows a solid-state electron device which comprises a diode made in accordance with this invention. On a substrate 22 which may be glass, for example, a layer of very pure conducting metal 24 such as aluminum is evaporated from a heated tungsten rod support under high vacuum conditions. This evaporation continues until a coating has been deposited sufficient to cover up any microscopic imperfections of the underlying glass. The high vacuum is then removed and the aluminum is anodized to obtain a layer of aluminum oxide 26. Such anodization was made with a nonsolvent electrolite at 4.5 volts for 15 minutes. According to information in a book by Holland, entitled, "Vacuum Deposition of Thin Films," and published by Wiley in 1956, the aluminum oxide layer thus formed is between 60 and 80 angstroms thick. The layers of aluminum and oxide are then placed in a vacuum again and a spot of conductive metal 28 is evaporated onto the insulator through a mask to form a coated area thereon. This spot of metal 28 may be aluminum also. More than one spot may be evaporated on the insulating layer, if it is desired, to form a number of independent and separate units. In order to apply an electric field across the insulating layer, connections are made to the metal plates 24, 28 by suitable well known techniques such as soldering or welding. These connections are brought out to terminals 30, 32.

Figure 4:
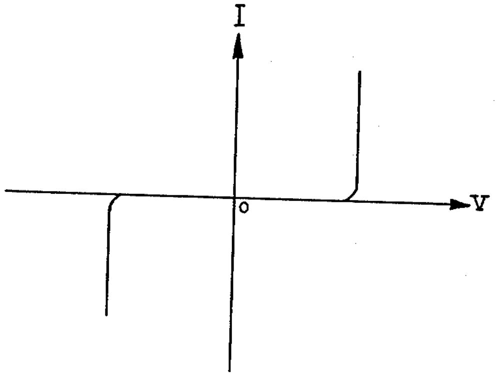
FIGURE 4 is a graph illustrating a typical voltage current characteristic derived for an embodiment of this invention which was constructed.

The unit which has been described, upon the application of voltage to the terminals 30, 32 acts as a diode and exhibits tunnel current. FIGURE 4 is a curve illustrating the behavior of this diode. It will be seen that in the region on either side of zero voltage substantially no current flows through the diode. However, when a minimum voltage level, which in the embodiment of the invention constructed was approximately 8 volts, is exceeded there is an onset of tunneling and current can flow through the unit.

It will be noted that the characteristic of the diode made in accordance with this invention is similar to that of avalanche diodes commonly called Zener diodes. Thus the utility of this invention is the same as that of Zener diodes except that this invention is capable of operating at much higher frequencies.

Besides the embodiment of the invention being used as a diode with nonlinear characteristics the concepts described herein may be employed to construct a controlled electron source. This source may be used as a cathode structure in a conventional vacuum tube or microwave tube, or may be used as the emitter-base structure of a transistor-like device. The reason that this statement can be made is that a metal-insulator interface, constructed in accordance with the teachings of this invention can be used as the controlled source of electronic current of very high density.

Figure 5:
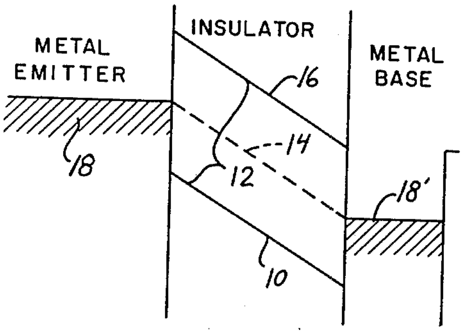
FIGURE 5 is an energy level diagram for another embodiment of this invention.

Referring now to FIGURE 5, there may be seen an energy level diagram similar to that shown in FIGURE 2 except that the righthand metal layer 18′ is made very thin in this case. This thickness should preferably be much less than the length of an electron mean-free path in the metal. As previously described, the electrons tunnel from the vicinity of the Fermi level of the metal 18 called the emitter this time passing through the insulator forbidden band 12 into the conduction band 16. Thereafter, the electrons can pass into the metal 18′. Since the metal region on the right is made thin compared with an electron mean-free path, most of the electrons which reach this region can continue through it, provided that they have sufficient energy to overcome the metallic work function and will emerge on the righthand side to provide a high current density electron source.

Figures 6, 8:
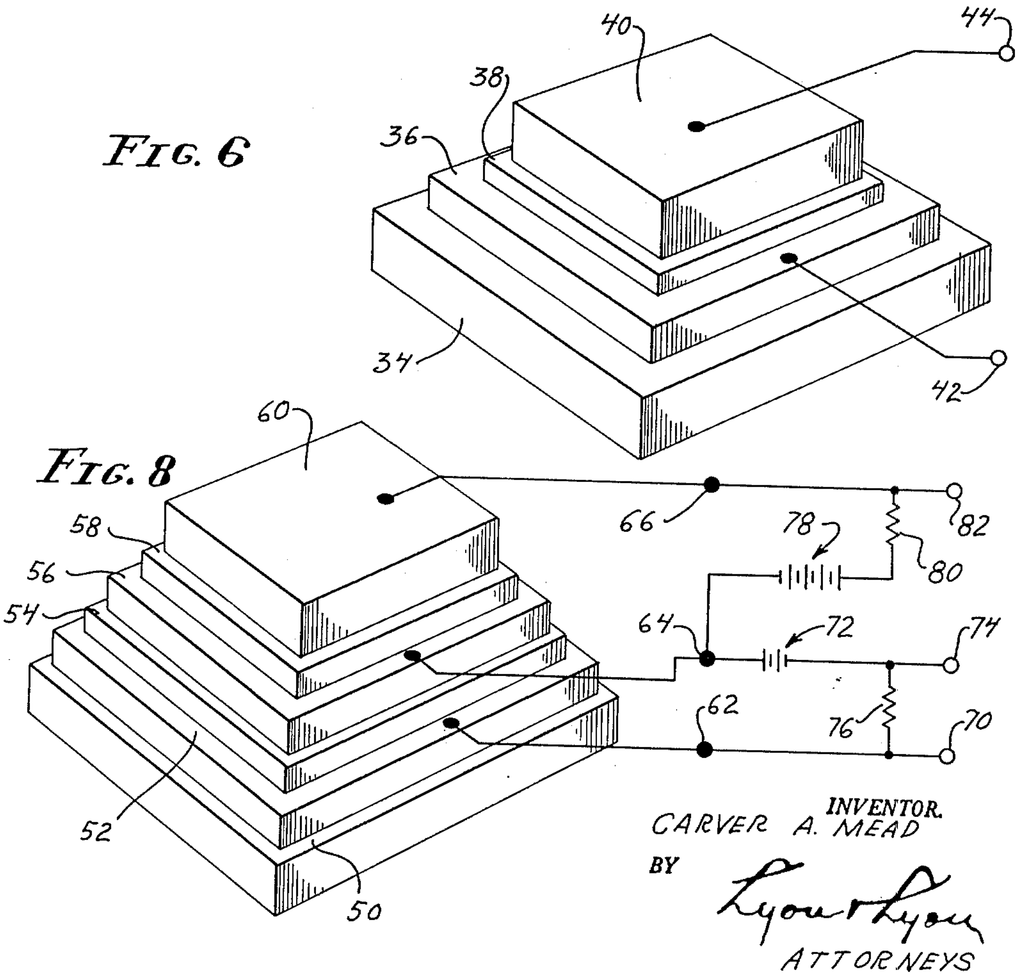
FIGURE 6 illustrates an embodiment of this invention which may be used as a controlled electron source.
FIGURE 8 illustrates an embodiment of this invention which can be used as a triode.

Referring now to FIGURE 6, an arrangement in accordance with the concept described is shown. It comprises a substrate 34 upon which a coating of a conductive metal material 36 is deposited, in the manner previously described. An insulating coating 38 is deposited or formed on the metal coating 36. Another metal coating 40 is deposited on the insulating coating 38. Connections are made from the metal coatings 36, 40 to terminals 42, 44. These terminals are employed to apply an electric field across the unit whereby a high current density electron source is provided. As indicated previously, the thickness of the insulating layer 38 and the conducting metal layer 40 should be on the order of or less than the length of the mean-free path of an electron in these materials. The lattice structures of the metal and the insulating material also should preferably be made compatible in order to avoid trapping at these adjacent surfaces.

Figure 7:
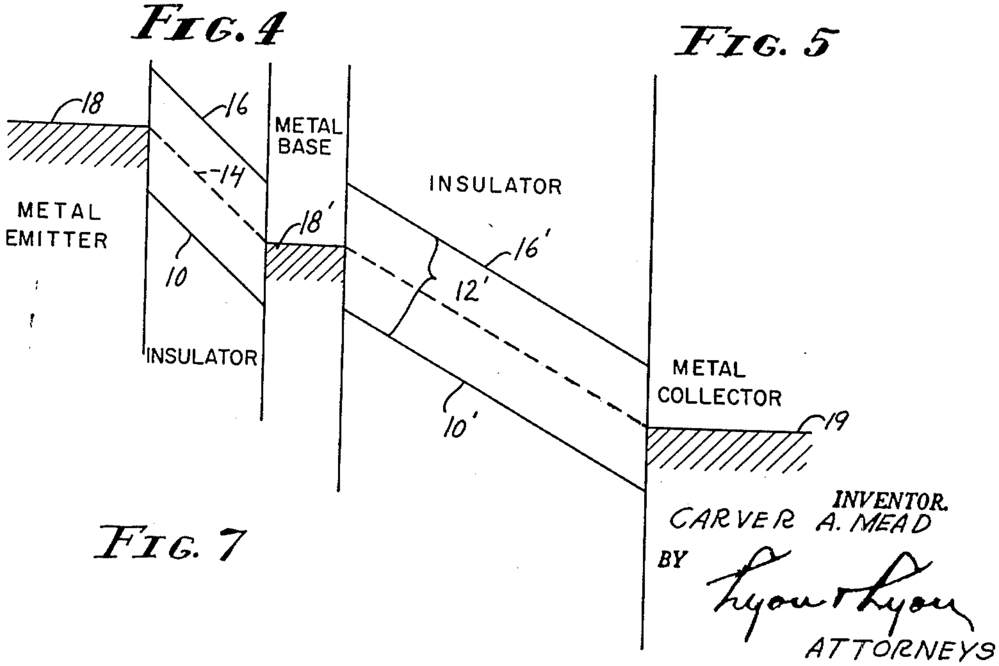
FIGURE 7 is an energy level diagram for another embodiment of this invention.

If, in addition to the source structure, another insulating layer 18′ and another conductive metal layer 19 is added, a triode structure is formed. The same techniques as have been described for making the diode may be used for depositing these coatings. An energy level diagram for such triode structure is shown in FIGURE 7. It will be seen that this resembles the diagram shown in FIGURE 5. The energy level diagram representation illustrating the second insulator also contains a valence band 10′ a forbidden band 12′ and a conduction band 16′. The thickness of this insulating layer should be less than that which can cause space charge limitation of the electron current emitted from the metal base and yet sufficiently thick to allow the desired maximum voltage to be applied from the collector to the base.

An electron from the emitter will cross the insulator and then the metal base. It then finds itself in the second insulator conduction zone. The electron can then be drawn to the collector by the electric field which exists in the second insulator.

The fabrication of the embodiment of the invention is shown in FIGURE 8. It includes a base 50 upon which there is deposited a coating of a conductive metal 52. On top of this conductive metal coating, there is deposited or formed a layer of insulation 54 having a thickness on the order of the distance of the mean-free path of an electron therein or less. Also it is preferred that the lattice structure of this insulator should reasonably match the lattice structure of the conductive metal 52. A second conductive metal layer 56 is deposited on the first insulating layer 54. A second insulating layer 58 is deposited on the second conductive layer 56. The thickness of the second insulating layer 58 should be as previously indicated, thick enough to allow the desired voltage applied thereacross from the second insulating layer yet not so thick as to permit space charge limitation of the flow of electrons which are received from the thin second conductive layer.

A third conductive metal layer 60 is deposited on the second insulating layer. The respective first, second and third conductive metal layers can be termed the emitter and base and collector layers, employing the same terminology as is employed in transistors. These layers are connected to terminals respectively 62, 64, 66. The application of electrical potentials to the emitter, base, and collector, to which these terminals are connected is identical with the application of potentials to a transistor of the n-p-n type. By way of example, terminal 62 is connected to a first terminal 70. Terminal 64 is connected through a battery 72 to a second terminal 74. A resistor 76 is connected between the terminals 70 and 74 also. The battery 72 is connected to bias the base 58 positive with respect to the emitter 52. Terminal 64 is connected to a battery 78 which is connected to terminal 66 through a resistor 80. Terminal 66 is also connected to another third terminal 82. The battery 78 biases the base 56 negative with respect to the collector 60. With these potentials being applied, terminals 70 and 74 can serve as signal input terminals and terminals 64 and 82 can serve as the signal output terminals.

Except for a higher positive bias voltage needed on the base to initiate tunneling, the embodiment of the invention acts very similar to a transistor. However, because current is carried by the majority rather than the minority carriers, the frequency response should be much higher. The emitter-base junction is a very low impedance junction and also has a high capacitance, and therefore, the same techniques as those used for tunnel diodes will be necessary to realize the inherent frequency capabilities of the device. As in the tunnel diode the high frequency response is the result of the extremely high transconductance and current density capability of the device which offsets the rather large input capacitance. The bias on the collector must be kept sufficiently low so that avalanche breakdown will not occur in the second insulator and further, no tunneling effect is achieved in the junction between the base and the third conductive coating (collector) whereby electrons are obtained independently of those being obtained from the emitter.

It should be noted that none of the qualitative characteristics described for the embodiments of the invention depend upon the fact that the materials described for constructing the embodiments of the invention are aluminum and aluminum oxide. Any chemically compatible metals and insulators may be used which can be fabricated into the desired geometry. The insulating film may be deposited anodically, by evaporation, or by other means. However, anodizing of pure aluminum is very convenient and a great deal of control of the oxide thickness may be achieved. Also, preferably, but not necessarily single crystals of the metal may be employed with an insulating layer deposited by a controlled oxidation process. The use of a single crystal of metal avoids the formation of traps at the interfaces. Thus any one or more of the conductive layers 24, 36, 52, 56 may be a single crystal. The collector layers 28, 40, 60 need not be. The insulator layers may be single crystal too, although this is not a strict requirement. The metals selected must have a sufficiently high binding energy that the metal ions will not be torn from the metal surface by the electric fields before electron tunneling takes place.

There has been accordingly described and shown herein a novel, useful and simple solid-state electron device capable of multiple uses such as a source of electrons, a diode having nonlinear characteristics, and a triode.

It will be appreciated that the embodiment of the invention may take many different shapes other than those shown in the drawings. The deposited layers may have a curved periphery instead of square as shown. The various layers may be deposited concentrically about a central substrate. Relative areas of the layers may vary and it is also possible to make more than one diode using a single metal coating and insulating layer thereon where the remaining metal coating consists of a plurality of isolated spots or islands of metal each of which provides a separate diode. Thus the drawings should be understood as exemplary of the appearance of one form of the invention indicating that it is a multilayer device but are not to be construed as a limitation on the invention. The width which can be given to the various layers may only be limited to the width at which lateral current in the base region restricts current density to the edge of the emitter. Thus limitation is essentially that found present in the manufacture of transistors also. It should be further understood that the various conductive metal layers need not necessarily be the same metal. Any metal layers which are compatible may be employed. By compatible is meant will not react adversely with the insulating layers and has the properties previously specified herein for the successive metal layers. Furthermore, successive insulating layers need not be of the same insulating material either. Finally, although only a diode and triode structure have been described, these teachings found herein are not to be limited thereto since those skilled in the art will readily recognize that multiple layer structures forming tetrodes, pentodes, etc. may also be constructed from these teachings and thus this inventive concept should not be limited to merely a diode or triode.

I claim:

1. A solid-state electron device comprising: two conductive metal material layers separated by an insulating material layer, said insulating material layer having a thickness of the order of, or less than, the mean-free path of an electron.

2. A solid-state electron device as recited in claim 1 whereon one of the conductive metal material layers has a thickness which is thin compared to the length of the mean-free path of an electron to permit electrons to pass through.

3. A solid-state electron device as recited in claim 1 wherein said conductive metal material layers are selected from a group comprising aluminum, tantalum, gold and platinum.

4. A solid-state electron device as recited in claim 1 wherein one of said conductive metal material layers comprises a single crystal of metal, and said insulating material layer comprises an oxide layer of the metal of said single crystal.

5. A solid-state electron device as recited in claim 1 wherein one of said conductive metal materials is made of a metal susceptible to anodic oxidation and said insulating material layer is the oxide of said metal.

6. A solid-state electron device comprising two conductive metal material layers separated by an insulating material layer and means to apply an electric potential to said conductive material layers, said insulating material layer having a thickness of the order of, or less than, the mean-free path of an electron, but great enough to prevent tunneling of electrons through said insulating layer except in the presence of an electric field, said metal material having a binding energy sufficient to prevent metal ions being torn loose before electron tunneling takes place.

7. A solid-state electron device as recited in claim 6 wherein one of said conductive metal material layers comprises a single crystal of metal, and said insulating material layer comprises an oxide layer of the metal of said single crystal.

8. A solid-state electron device comprising a layer of aluminum, a layer of aluminum oxide on one surface of said layer of aluminum, said aluminum oxide having a thickness less than the mean-free path of an electron, therein, and a second aluminum layer on said aluminum oxide layer.

9. A solid-state electron device comprising a first and second conductive metal layer separated by a first layer of insulating material, said insulating layer of material having a thickness less than the mean-free path of an electron, said second conductive metal layer having a thickness less than the mean-free path of an electron, a second layer of insulating material on said second conductive layer surface opposite to that adjacent said first layer of insulation material, said second insulating layer having a thickness less than that which will cause space charge limitation of the electrons emitted from said second conductive layer, and a third conductive metal layer on said second insulating material layer.

10. A solid-state electron device as recited in claim 9 wherein one of said conductive metal layers comprises a metal susceptible to anodic oxidation and the adjacent layer of insulating material comprises the oxide of said metal.

11. A solid-state electron device as recited in claim 9 wherein said conductive metal material layers are selected from the group comprising aluminum, tantalum, gold and platinum.

12. A solid-state electron device having an emitter base and collector electrode each respectively comprising a conductive metal layer, said base conductive metal layer having a thickness less than the mean-free path of an electron, a first insulating layer spacing said emitter and base conductive metal layers said first insulating layer having a thickness less than the mean-free path of an electron, and a second insulating layer spacing said base and collector conductive layers, said second insulating layer being less than that which can cause space charge limitation of electron current emitted from the base electrode.

13. A solid-state electron device comprising a plurality of alternate layers of conductive metal material and insulating material, at least one of said insulating material layers having a thickness on the order of the mean-free path of an electron therein or less, at least one of said metal material layers having a thickness on the order of the mean-free path of an electron therein or less, means for applying an operating potential to each conductive layer of said solid-state electron device and means for applying a control signal to one of said layers of said conductive metal material for controlling the flow of electron current through said electron device responsive to said control signal.

References Cited in the file of this patent

UNITED STATES PATENTS

| | | |
|---|---|---|
| 1,919,988 | Rupp | July 25, 1933 |
| 2,651,009 | Meyer | Sept. 1, 1953 |